United States Patent [19]

Clark

[11] 3,998,056
[45] Dec. 21, 1976

[54] SOLAR ENERGY APPARATUS AND METHOD

[76] Inventor: Robert O. Clark, 1921 Truman NE., Albuquerque, N. Mex. 87110

[22] Filed: Feb. 26, 1975

[21] Appl. No.: 553,267

[52] U.S. Cl. .................................. 60/641; 60/530; 60/682
[51] Int. Cl.² .......................................... F03G 7/02
[58] Field of Search ............ 60/641, 652, 659, 650, 60/682, 530; 122/270, 271

[56] References Cited

UNITED STATES PATENTS

| | | | |
|---|---|---|---|
| 1,032,236 | 7/1912 | Patten | 60/650 |
| 1,717,161 | 6/1929 | Malone | 60/530 |
| 2,968,916 | 1/1961 | Taylor et al. | 60/641 |
| 3,055,170 | 9/1962 | Westcott, Jr. | 60/530 X |
| 3,413,856 | 12/1968 | Lombardi | 92/92 X |
| 3,903,699 | 9/1975 | Davis | 60/641 |

Primary Examiner—Allen M. Ostrager

[57] ABSTRACT

Method and apparatus for converting solar energy to mechanical or electrical energy includes an enclosed fluid containing field of pipes and a reservoir in fluid communication therewith. During the daylight hours, solar produced heat impinges upon the field causing the fluid therewithin to expand. The expanding fluid escapes from the field via a pipe through which it is conducted to the reservoir through a fluid turbine to produce rotational mechanical energy. During the nighttime, the volume of the fluid contracts, reversing the process. The fluid at night returns from the reservoir to the field, again being conducted through the turbine to produce mechanical rotational energy in the process. Throughout the entire process, the fluid remains in a substantially incompressible state.

1 Claim, 2 Drawing Figures

SOLAR ENERGY APPARATUS AND METHOD

BACKGROUND OF THE INVENTION

1. Field of the Invention

This invention relates to improvements in methods and apparatus for generating mechanical or electrical energy from solar energy, and, more particularly, to a method and apparatus for producing mechanical or electrical energy from solar energy directly from the thermally produced expansion of a fluid.

2. Description of the Prior Art

Recently, there has been renewed and vigorous efforts in harnessing or utilizing solar energy. This is particularly true in southwest regions of the United States in which the sun shines a large percentage of the days of the year, such as in New Mexico, Arizona and Nevada.

Aside from thermoelectric transducers, one of the classical methods for utilizing solar energy is by first converting the heat from the sun to mechanical energy, which can be easily converted to electrical energy for distribution and use. More particularly, many of the mechanical apparatuses used in collecting solar energy employ fields of pipes or other fluid containers. Most commonly, the fields employed have associated means for magnifying or focusing the sun's rays onto the field to elevate the temperature of the fluid in the field to a very high degree. Depending upon the particular fluid in the field, the fluid can be changed in state, for example, from liquid to gas, and the reconversion energy harnessed by way of, for example, a steam turbine or the like.

Other apparatus for utilizing the heat of the super heated water or fluid most commonly employ steam generators of one kind or another. For example, in Summers, *The Conversion of Energy*, Scientific American, September 1971, a system is described in which sunlight is impinged upon a collector panel to heat liquid sodium to a temperature of 1000° Fahrenheit. The liquid sodium is conducted through a molten salt heat exchanger-reservoir to heat steam to drive a turbine. The molten salt is employed to hold the heat during the night and when the sun is hidden by the clouds so that steam will be produced nonetheless during those times. The turbine, in turn, drives a generator to produce electrical energy. The high temperatures involved are produced, in the field, naturally by some focusing or magnifying apparatus.

Among the difficulties encountered in the utilization of such solar energy conversion devices are the handling of the fluids and associated apparatus at such extremely high temperatures as are derived from the sun, not uncommonly in the neighborhood of 1000° Fahrenheit, as above described. Much effort has been devoted, for example, just to the problems in containing fluids at such high temperatures and pressures within the field throughout their conversion to steam or other gaseous state. Furthermore, since the fluids are commonly changed in states, such as from liquid to gas, special condensers or other apparatuses are required to condense the steam or gas back to the liquid or fluid state after its energy has been removed, to continue the process. since many of the apparatuses advanced heretofore rely upon the heating of the fluid to produce steam or other gas directly or indirectly, they are operational only during the daytime, unless special heat retaining reservoirs are employed, such as that above described. This, of course, further complicates maintenance and increases the expense of the over-all system.

Another commonly used technique in efforts to achieve the most efficient use of the sun is by providing special apparatus to vary the alignment of the solar energy collector or field. Thus, the field in such instances is maintained at a particular attitude with respect to the sun so that the sun's rays fall thereon at a predetermined angle, ideally normal to the face of the field. Such alignment systems are particularly cumbersome, especially with relatively large collector fields, and, entail additional maintenance and expense.

Other, more direct systems which operate at lower temperatures and pressures have been proposed. For example, d'Amelio, *The Hot-Water Thermal Cycle in the Utilization of Solar Energy*, Solar Energy Journal, at page 138 et seq. describes apparatus in which the sun's energy is directed onto a flat plate collector field containing water. The water is heated to produce low pressure steam. The steam is then conducted to a turbine to turn it to generate mechanical rotational energy. The steam exiting from the turbine is then condensed in a condenser and recirculated via a pump back into the field.

The d'Amelio devices, however, present many of the problems mentioned above, but, in addition, do not operate in a continuous fluid state, in distinction to applicant's apparatus, as below described. On the contrary, the d'Amelio devices operate on the principle of a pressure difference developed across a turbine. This difference is developed by the pressure of the low pressure steam on the collector side of the turbine and by the lower pressure created by the condensation produced in the condenser on the other side of the turbine. Thus, some change in the state of the fluid is produced, even though it is at relatively low pressures and temperatures, to develop the necessary pressure differential to drive the turbine. Additionally, in the d'Amelio apparatuses, the collector field must be singularly oriented in a gravitional field to separate the non-vapor portions of the fluid to produce the pressure differential and to complete a continuous recirculating cycle.

The next step which might be suggested, although not actually disclosed by d'Amelio in the above referenced paper, is a continuous fluid system in which the fluid state is maintained throughout the system. Using the d'Amelio apparatus, this could utilize, for instance, the change in density of the fluid produced by the solar heating. This change in density could be applied to one arm of the turbine, and the fluid of unchanged density applied to another arm. The weight difference would produce a turning force upon the turbine which could be readily utilized.

This density difference possibility which might be envisioned (although not disclosed) should still be distinguished from applicant's apparatus which utilizes directly the produced fluid expansion, as below set forth.

BRIEF DESCRIPTION OF THE INVENTION

In light of the above, it is an object of the invention to provide a method and apparatus for producing mechanical or electrical energy from solar energy.

It is another object of the invention to provide a method and apparatus for producing mechanical or electrical energy from solar energy, utilizing a fluid, without requiring a special heat maintaining reservoir and solar energy focusing or magnifying apparatuses.

It is still another object of the invention to provide a method and apparatus for converting solar energy to mechanical or electrical energy utilizing a fluid which expands upon heating and which remains in an incompressible state throughout the entire energy conversion process.

It is yet another object of the invention to provide a method and apparatus for producing mechanical energy in the form of mechanical rotation induced by movement of a fluid which is expanded under the influence of solar energy.

It is still another object of the invention to provide a method for producing mechanical or electrical energy from solar energy which is operational during both daytime and nighttime hours.

It is still yet another object of the invention to provide a method and apparatus for converting solar energy to mechanical or electrical energy in which special apparatus to vary the alignment of the collector field with sun's movement are not necessary.

These and other objects, features, and advantages will become apparent to those skilled in the art from the following detailed description when read in conjunction with the accompanying drawings and appended claims.

The invention, in its broad aspect, presents an apparatus for converting solar energy produced heat to mechanical energy. The apparatus includes an enclosed solar energy receiving fluid container adapted to transmit the absorbed solar energy heat to an enclosed fluid, a fluid reservoir, and a pipe to fluid communication between to container and reservoir. A fluid is contained within the container and pipe, the volume of the fluid being changed by the heat absorbed thereby. The fluid flows between the container and the reservoir when the container is heated. The fluid remains in a substantially incompressible state within the container and pipe. Means are also provided coupled to the pipe to convert the fluid flow therewithin to mechanical energy, such as a fluid driven turbine.

In another aspect of the invention, a method for converting solar energy to mechanical energy is presented. The method includes the steps of exposing an enclosed field to the sun to heat a fluid within the field to produce expansion of the fluid therewithin, and allowing the expanding fluid to escape from the field as it expands, and conducting the escaping fluid in an incompressible fluid state from the enclosed field to a mechanical energy producing means driven by the escaping fluid.

BRIEF DESCRIPTION OF THE DRAWING

The invention is illustrated in the accompanying drawing, wherein.

DETAILED DESCRIPTION OF THE PREFERRED EMBODIMENTS

In accordance with a preferred embodiment of the invention, a method and apparatus are presented for utilizing the sun's energy, using the naturally occurring day/night cycle, by which a fluid is heated during the day to expand, and allowed to cool during the night to contract in volume.

Figure 1:
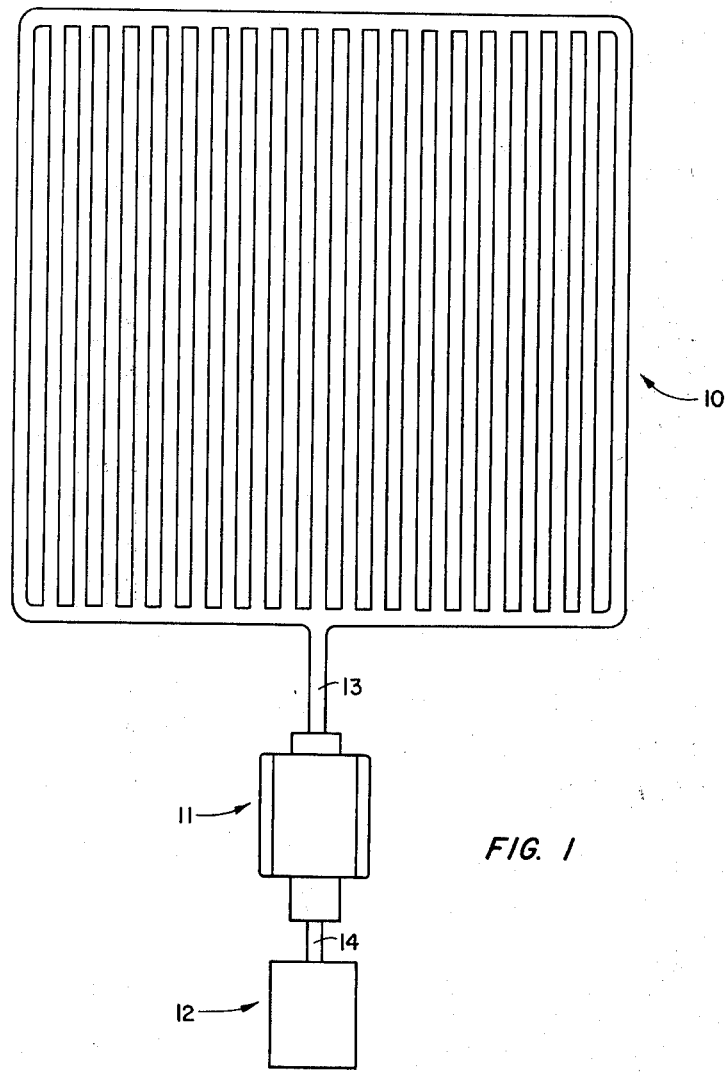
FIG. 1 is a plan view of an apparatus for converting solar energy to mechanical and electrical energy, in accordance with the principles of a preferred embodiment of the invention.
Figure 2:
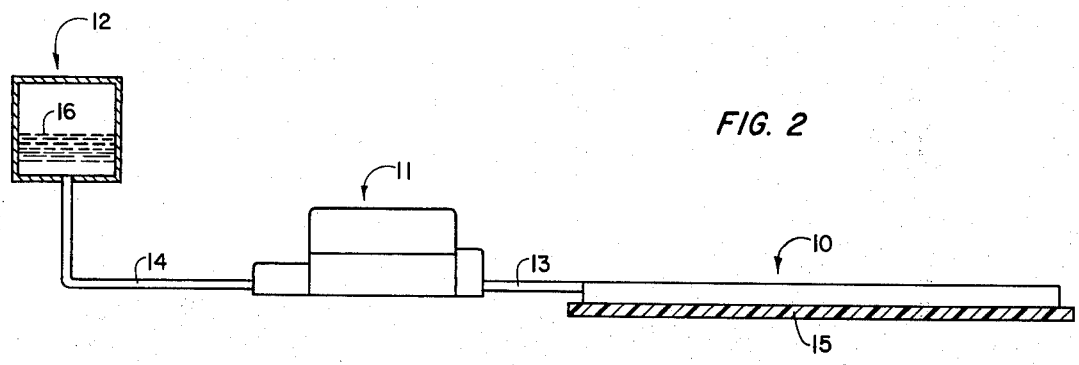
FIG. 2 is a side view, partly in cross section, of the apparatus of FIG. 1.

Thus, as shown in FIGS. 1 and 2, a field 10 is provided upon which the sun's rays are permitted to fall during the day. The field 10 includes a plurality of intercommunicating pipes laid side by side, as shown, to form an enclosed solar energy receiving fluid container. The fluid container 10 can be disposed at any desired orientation, the simplest being, as shown, merely laid flat upon the ground. The precise configuration of the field 10 is not critical. Thus, any structural configuration of pipes can be used, the convenience of fabrication and maintenance being the primary consideration.

The pipes forming the field 10 can be of any available type, but are preferably of metal or heat conducting material to absorb the solar heat and transmit it to the contained fluid. The pipes should have sufficient strength, however, to withstand the anticipated fluid pressures as will be encountered, as below described.

A fluid turbine 11 and a fluid reservoir 12 are provided, in communication with the field 10. The reservoir 12 is located at a height above the level of the field 10. Thus, as will become apparent, the fluid within the reservoir 12 is acted upon by gravity to be normally drawn into the field 10 from the reservoir 12. The fluid within the field 10 is conducted by a pipe 13 to the fluid turbine 11, and by a pipe 14 from the fluid turbine 11 to the reservoir 12. Thus, the reservoir 12 is in communication via the pipe 13, the fluid turbine 11, and the pipe 14, to within the field 10.

The fluid used in the system can be of any type having a sufficiently high coefficient of expansion to produce the necessary fluid flow volume. For example, pentane, having a coefficient of expansion of $1.65 \times 10^{-3}$ $\Delta$ volume/volume/degree centigrade can be employed.

If desired, an electrical generator (not shown) can be coupled to the turbine 11, to be driven by mechanical rotation of the turbine, in a manner well known in the art.

To prevent loss of heat energy from the field 10 to the underlying ground, a layer of insulation 15 is provided, as shown in FIG. 2, between the field 10 and the ground. Thus, in operation, during the day, as the sun falls upon the pipes of the field 10, the fluid therewithin is heated and expands. The expanding fluid can escape from the field 10 only through the fluid turbine 11 through the pipes 13 and 14, to the reservoir 12. Thus, the turbine 11 is driven during the daylight hours by the expanding fluid flowing through the pipes 13 and 14.

At night time, the fluid 16 (FIG. 2) within the reservoir 12 as well as the fluid within the field 10 cools. When the fluid cools, it contracts in volume in the opposite manner from the expansion during the daytime. Therefore, the fluid within the reservoir 16 flows back into the field 10, through the turbine 11 via pipes 13 and 14 to drive the fluid turbine 11 during the night time cycle.

As an example of a practical system in realizing the invention, the field 10 can be constructed over a relatively large area in a desert region of, for example, 1 square mile. The pipes are of 1 foot diameter, painted flat black to absorb as much of the sun's energy as possible. The pipes are then connected through a fluid turbine to a reservoir, as shown in FIGS. 1 and 2. The field of pipes 10, the turbine 11, and the interconnecting pipes 13 and 14 are then filled with a fluid having a relatively high coefficient of expansion, such as pentane. As mentioned above, the coefficient of expansion of pentane is $1.65 \times 10^{-3}$ Δ volume/volume/degree centigrade. Assuming a temperature change of 100° centigrade on a very good day, the change in volume within the field is ideally $4.29 \times 10^6$ feet per 8 hours through the pipe's cross-section. (The pentane contents of a 1 foot diameter pipe will heat to 100° centigrade in 8 hours of solar radiation exposure if 90% of the impinging radiation is absorbed.) In actual practice, the change in volume is reduced because some of the original volume within the field is removed before the full temperature is achieved, and because of the linear expansion of the pipes which slightly increases the volume of the field 10. Thus, in reality, the change in volume is approximately $3.432 \times 10^6$ feet per 8 hours through the pipe's cross-section. Thus, with the system constructed as above described, a maximum flow rate through the turbine 11 of approximately 81 miles per hour is realized.

During the night time hours, the opposite effect occurs in which the temperature of the field decreases by, for example, 100°, and the fluid contracts in the same relative proportions, thereby returning from the reservoir 12 through the turbine 11 to the field 10. To further enhance the return of the fluid from the reservoir 12 to the field 10, the reservoir 12 is enclosed, and an inert gas is introduced therewithin. When the reservoir 12 begins to fill with the fluid 16 (FIG. 2), the inert gas (not shown) is compressed, thereby to urge the fluid 16 back in the direction of the field 10.

Other types of fluid flow to mechanical energy type devices are known, and are not described further herein. It should be appreciated, also, that fluid turbines which can operate under the influence of fluid flowing in either direction are known in the art, and can be used to equal advantage as the above described systems, if desired.

Although the invention has been described and illustrated with a certain degree of particularity, it is understood that the present disclosure is made only by way of example and that numerous changes in the details of construction and the combination and arrangement of parts may be resorted to without departing from the spirit and the scope of the invention as hereinafter claimed.

I claim:

1. Apparatus for generating electrical energy, comprising:
    a field of enclosed pipes to receive solar energy during the daytime,
    a fluid reservoir, located at a height above the level of said field,
    a pipe communicating between said reservoir and said field to conduct fluid therebetween,
    a substantially incompressible fluid filling said field and said pipe, said fluid expanding in volume when it is heated by the solar energy received by said field during the daytime to flow from said field to said reservoir through said pipe, and contracting in volume when heat is lost therefrom during the nighttime to flow from said reservoir into said field through said pipe,
    a fluid turbine,
    valve means interconnecting said pipe and said turbine for directing said fluid flow in said pipe through said turbine in a single direction to drive said turbine during the expansion and contraction of the volume of said fluid,
    and an electrical energy generator coupled to said turbine.

* * * * *